United States Patent
Ranganathan et al.

(10) Patent No.: US 7,662,322 B2
(45) Date of Patent: Feb. 16, 2010

(54) HIGH TEMPERATURE AND HIGH HUMIDITY RELEASE COATING FOR POLYMER FILM

(75) Inventors: Sumita Sanjeevi Ranganathan, Kingston (CA); Theodore John Lang, Inverary (CA); Marek Andrej Szymula, Kingston (CA)

(73) Assignee: Exopack Preformance Films Inc. (CA)

( * ) Notice: Subject to any disclaimer, the term of this patent is extended or adjusted under 35 U.S.C. 154(b) by 672 days.

(21) Appl. No.: 10/543,165

(22) PCT Filed: Jan. 22, 2004

(86) PCT No.: PCT/CA2004/000086

§ 371 (c)(1),
(2), (4) Date: May 26, 2006

(87) PCT Pub. No.: WO2004/065467

PCT Pub. Date: Aug. 5, 2004

(65) Prior Publication Data

US 2006/0257580 A1    Nov. 16, 2006

Related U.S. Application Data

(60) Provisional application No. 60/441,964, filed on Jan. 23, 2003.

(51) Int. Cl.
*C09D 101/28* (2006.01)
(52) U.S. Cl. .................. 264/145; 264/175; 264/212; 106/194.1; 524/35
(58) Field of Classification Search .......... None
See application file for complete search history.

(56) References Cited

U.S. PATENT DOCUMENTS

| | | |
|---|---|---|
| 2,273,040 A | 2/1942 | Iler |
| 3,484,271 A | 12/1969 | Kaliski et al. |
| 3,503,773 A | 3/1970 | Heinrich et al. |
| 3,837,375 A | 9/1974 | Higgins et al. |
| 3,945,404 A | 3/1976 | Yamamatsu et al. |
| 3,976,490 A | 8/1976 | Macleish |
| 4,226,749 A | 10/1980 | Veaute |
| 4,735,860 A | 4/1988 | Mizobuchi |
| 4,956,233 A | 9/1990 | Chu et al. |
| 4,956,241 A | 9/1990 | Chu et al. |
| 5,061,769 A | 10/1991 | Aharoni |
| 5,139,835 A | 8/1992 | Kitamura et al. |
| 5,492,599 A | 2/1996 | Olson et al. |
| 5,547,738 A | 8/1996 | Mitchell et al. |
| 5,858,487 A | 1/1999 | Boehler et al. |
| 5,959,031 A | 9/1999 | Thurgood |
| 6,776,831 B2 | 8/2004 | Chopra et al. |
| 2002/0136843 A1 | 9/2002 | Chopra et al. |

FOREIGN PATENT DOCUMENTS

| | | |
|---|---|---|
| EP | 0295375 A2 | 12/1988 |
| JP | 63075199 | 4/1988 |

OTHER PUBLICATIONS

Dow Methocel Cellulose Ethers Technical Handbook, Dow Chemical Company Website, Jul. 2000.

*Primary Examiner*—Richard Crispino
*Assistant Examiner*—Barbara J. Musser
(74) *Attorney, Agent, or Firm*—Stoel Rives LLP

(57) ABSTRACT

A coating composition for use as a surface coating for polymer release films for use in at least one of high temperature and high humidity applications, which comprises a solution of at least one hydroxypropyl methylcellulose having hydroxypropyl molar substitution of from 0 to about 0.82 in combination with at least one water-borne fluorochemical additive selected from perfluoralkyl methacrylic acid copolymers.

12 Claims, 3 Drawing Sheets

Figure 1

TRANSFER RATING= 4, Patches NOT acceptable

Figure 2

TRANSFER RATING= 3, Scattered spots before and after talking, NOT acceptable

Figure 3

TRANSFER RATING= 2, Spots only on Talcing, not acceptable, NOT acceptable

Figure 4

TRANSFER RATING= 1, Very few Spots only on Talcing, acceptable

Figure 5

TRANSFER RATING=0, No Transfer at all

HIGH TEMPERATURE AND HIGH HUMIDITY RELEASE COATING FOR POLYMER FILM

CROSS-REFERENCE TO RELATED APPLICATIONS

This application is a 371 of PCT Application No. PCT/CA2004/000086, filed Jan. 22, 2004, now pending, which claims priority from U.S. Provisional Application No. 60/441,964, filed Jan. 23, 2003, each of which is incorporated by reference herein in their entireties.

FIELD OF THE INVENTION

The present invention relates to an improved release coating composition that may be applied to a film that may then be used as a substrate useful for applications requiring release for a broad range of temperatures and high humidity conditions, which temperatures may range from about 20° C. to about 210° C. These applications include release substrate used in the manufacture of calendared cured sheet rubber and molding paste composites, such as sheet molding compound (SMC), thick molding compound (TMC), bulk molding compound (BMC) and fiberglass composites.

BACKGROUND OF THE INVENTION

In the rubber industry, sheets of cured rubber compound are prepared by a calendaring process. Typically these sheets are from about 100 to about 400 feet in length. The uncured rubber sheet is laid onto a supporting interleaf film or sheet and then the two sheets are wound onto a mandrel. The interleaf is usually cellophane or silicon coated paper. The interleaf does not melt at the curing temperature and prevents the sheets from fusing with each other during the curing process. Sometimes talc or zinc stearate is applied to the interleaf to enhance release of rubber sheets from the interleaf after curing. Subsequently, the roll of rubber and interleaf can be over wound and held under tension using an over-wrap, which can be any film or cloth having good tensile properties that tends to shrink at oven curing temperatures. The cured sheet rubber may be used as components for aircraft engines and gaskets for rubber roofing membranes. Teflon® sheets, talc dust, and cloth are commonly used as interleaves in the rubber industry.

SMC is a composite material and usually comprises crosslinkable polymeric resin, most often unsaturated polyester resin; styrene monomer, plus catalyst; particulate filler, such as calcium carbonate; chopped glass fiber reinforcement; and various other additives in minor amounts, such as pigments and other modifiers.

The manufacture of SMC begins by laying the paste comprising all ingredients except the glass fibers, on a bottom carrier or release sheet, i.e., a film. The glass fibers are poured on top of the resin. More paste is poured over the glass fibers. A top carrier release sheet is laid down, and the edges of the top and bottom sheets are folded over to form a sandwich. The film and hence the composite is then kneaded to mix the glass fibers and the paste. The sandwich is then festooned (folded back and forth in a continuous fashion) into a bin and stored for up to about 14 days to cure or mature. Satisfactory results may be obtainable after as little as 2.5 days, but often more time is required. During this time the viscosity of the composite increases significantly (approximately ten-fold).

At the end of the curing period, the carrier release films, top and bottom are stripped away, the solidified SMC is cut and put into a heated press. In roughly one minute or less, out comes a semi-finished product, such as an auto part, for example, an automobile hood.

TMC is produced by a different machine and a process different from those used for producing SMC. Although TMC is prepared as a continuous length of material, it is cut into slabs for curing and storage because it is thicker than SMC. SMC is usually 1" thick, but may range from ¼" to 3" in thickness. TMC may range from ½" to 4" in thickness. TMC is stronger because some of its fiberglass fibers may be positioned vertically, and more filler may be added. A most significant difference between SMC and TMC is that in making TMC, the glass fibers are mixed with the paste prior to being deposited on the carrier or release film, and thus no kneading of the composite sandwich is necessary when TMC is made into slabs. This therefore places different requirements on the carrier or release film as tear strength may not be as critical for carrier release film used to make TMC.

BMC is also a composite material of resins, fillers and reinforcements. Typically, it comprises 30% resins, 50% fillers and additives and 20% reinforcement, such as glass fiber. It may also contain catalysts. The high filler loadings can provide improved stiffness and fire retardance. BMC is manufactured by preparing a putty-like molding compound comprising the above-noted components in a "ready to mold" form. Molding pressures usually range from about 350 to 2000 psi at temperatures of between 121 and 176° F. BMC can be made into precise shapes with various types of inserts, and therefore the moldings can be extremely complex. One limitation of BMC is the loss of strength caused by degradation of glass fiber reinforcements during energy-intensive mixing.

BMC is primarily used as a replacement for cast metals. The actual physical characteristics of BMC are determined primarily by the choice of resin and desired end use. Possible end uses include electrical grade; low shrink/general purpose; appliance/structural; low profile; automotive grade; and corrosion resistant. Major applications of BMC include air conditioner components; pump housings; circuit breakers; computer and business equipment components; garbage disposal housings; motor parts; power tools; gear cases; electrical insulators; and circuit covers.

In selecting a carrier release film there are some basic requirements or properties that are preferably met for the film to be suitable. While styrene barrier, moisture barrier, and mechanical strength are relevant, most important are release from the paste composite, be it SMC, BMC, or TMC, and the cost of the release film.

Nylon films represent a potential replacement for silicon-coated paper and cellophane as Interleaves in the rubber calendaring industry, because of their high tensile strength. The plain Nylon films work quite well as release films in the case of some but not all rubber samples. Apart from sticking to the sheets of rubber, the nylon film sometimes causes wrinkles on the surface of the cured rubber. It is speculated that gases emanated during curing of rubber cause such wrinkles.

Cellulose ethers are water-soluble polymers derived from cellulose. A commercially available cellulose ether is available under the Methocel® brand from The Dow Chemical Company. These products are available in various viscosity grades, ranging from 3 to over 200,000 mPa's. Generally, these viscosities refer to the viscosity of a 2% Methocel® solution in water at 25° C. The methylcellulose products include hydroxypropyl substituted cellulose ethers. Such products are also available from other sources such as China Yixing Kaili Chemical Pharmaceutical Factory of Yixing city, Jiangsu, China; Carbomer Inc of Westborough, Mass.; and Penta Mnfg. Co. of Livingston, N.J. Methocel® products are used as mold-release agents, stabilizers, and thickeners in rubber latexes, where they contribute also to more uniform drying and less pinholing (see Dow METHOCEL® Cellulose Ethers Technical Handbook available from The Dow Chemical Company Website, July 2000).

BACKGROUND ART

In co-owned U.S. Pat. No. 6,776,831, there is disclosed a coating composition for use as a surface coating for polymer release films for use in high temperature and/or high humidity applications, which comprises a solution of at least one hydroxypropyl methylcellulose having hydroxypropyl molar substitution of from 0 to about 0.82.

Various attempts have been made to make and coat non-stick coatings to film or film structures used for high temperature applications. Some of the prior art patents pertaining to release coatings are summarized hereafter:

U.S. Pat. No. 5,139,835 to Kitamura et al discloses a synthetic resin laminated paper which makes it possible to recover paper (or laminated film) materials easily and rationally. The adhesion-release control agent layer interposed between the polyethylene film and paper layer can be polyvinyl alcohol, silicone based compound, or a reaction product of an organopolysiloxane compound having at least one double bond which has reacted with said hydrogen atom.

U.S. Pat. No. 3,503,773 to Bisschops et al discloses a process for forming films or foils using a high-gloss-surface or the "casting layer". The film-forming polymer solution is applied to the casting layer and at the end of the process the polymer film is stripped off the casting layer. The casting layer is a mixture of cellulose acetate and Werner chromium complex salt.

U.S. Pat. No. 4,956,233 to Chu et al discloses a slip-coated thermoplastic film having good antiblocking properties. The slip coating comprises of an aqueous wax emulsion or dispersion and a minor amount of talc, syloid or amorphous silica gel.

U.S. Pat. No. 4,956,241 to Chu et al discloses a slip-coated biaxially oriented film having good antiblocking properties. The slip coating comprises of (a) an aqueous wax emulsion or dispersion, (b) an aqueous polymer solution or emulsion with $T_g$ between 30°-100° C., and (c) a minute amount of talc or syloid.

U.S. Pat. No. 3,945,404 to Yamamatsu et al discloses a food casing having the inner surface thereof coated with a water-soluble chromium complex to enhance the release of processed meat from the casing.

U.S. Pat. No. 5,547,738 to Mitchell et al discloses linerless labels where the substrate has a pressure sensitive adhesive on one face and a release coating on the other. The preferred release coatings are formulations, which include silicone resins and chrome complexes of fatty acids.

U.S. Pat. No. 5,492,599 discloses a treated cellulose-based substrate e.g. paper with good release properties. The treated substrate is coated with a primer coating comprising a cationic polymer and with a release coating comprising a carboxy- or carboxylate-containing release polymer.

U.S. Pat. No. 2,273,040 describes Quilon®, Werner-type chrome complexes useful for making a variety of substrates hydrophobic, oleophilic, and softer.

U.S. Pat. No. 3,484,271 to Kaliski et al describes a two-step process where a polyfunctional anionic component is applied followed by treatment with a polyfunctional cationic component (Quilon® Chrome Complex) to yield a surface adhesive to cooked food and plastic masses.

Japanese Examined Patent Application 63,075,199 (Kanzaki Paper) describes a water-soluble copolymer release agent for paper, with Tg of 60-20° C., consisting of (a) 5 to 50% of a hydrophilic ethylenically unsaturated monomer, e.g., (meth)acrylic acid or maleic acid, (b) 20 to 95% of a (meth)acrylate monomer having 4-10 carbons, e.g. butyl or hexyl, and (c) 0 to 40% of another copolymerizable monomer, e.g. vinyl acetate, styrene or acrylonitrile. The release paper has excellent threading and release properties.

U.S. Pat. No. 4,226,749 describes a sizing composition with a cationic and anionic component mixture in a clay coating formulation.

U.S. Pat. No. 3,976,490 describes topical coating comprising a particulate material e.g. silica, $CaCO_3$ in a polymeric binder adhered to the opaque plastomeric sheet material. The size of the particles and the thickness of the binder are selected to provide for the protuberance of at least a portion of the particles to act as spacers and thus function as the primary antiblocking component.

U.S. Pat. No. 5,959,031 issued to Thurgood Sep. 28, 1999 describes a polyamide film forming resin and at least one release agent material selected from the group consisting of N,N' ethylene bis amides of the formula $R_1$—CO—NH—$CH_2$—$CH_2$—NH—CO—$R_2$ wherein $R_1$ is an aliphatic hydrocarbon chain of about 14 to about 42 carbon atoms, and $R_2$ is a hydrogen atom or an aliphatic hydrocarbon chain of about 14 to about 42 carbon atoms, wherein the release agent material is present in an amount such that after the paste composite is formed, substantially all of the film can be removed from the surface of the composite.

U.S. Pat. No. 3,837,375 to Higgins et al describes a container used for packaging viscous tacky polymers by the process of hot filling. The latter containers have an inner lining of heat stabilized nylon coated with a silicone release agent; an uncoated cellophane film; a mineral pigment coated kraft paper overcoated with a silicone release agent; or kraft paper coated with finely divided mica. These containers are able to withstand hot packaging temperatures up to 450° F. and at the same time permit the contents to be readily removed.

European Patent EP 0295375A2 discloses a silicone coated release film used in film impregnation of cyanate resin based prepegs in a continuous process. The release film is stripped from the advancing impregnated film while simultaneously one or more new release films are applied to the prepeg before, during or after impregnation. Apparently, the silicone coated release papers showed better release than those coated with QUILON® in the temperature range of 125° C.-300° C.

U.S. Pat. No. 5,858,487 to Boehler et al discloses a six layer microwaveable food wrap where the top layer is a non-stick coating for use in preventing food from adhering to a polymeric layer. The non-stick coating is made from a chrome complex of stearic acid ((chromium, pentahydroxy, (tetradecanoata)di-)), and is commercially available from E.I. du Pont de Nemours and Company as QUILON® C complex (both methyl cellulose and hydroxypropyl methylcellulose are recognized as acceptable food additives by the US Drug Administration (FDA) and are listed in the food chemicals codex alimentarius (Dow's product literature)).

U.S. Pat. No. 4,735,860 discloses a heat transfer sheet, which prevents sticking and blocking problems and makes it possible to carry out printing smoothly. The latter sheet has hot-melt ink layer or one side and heat-resistant protective layer on the other. The heat-resistant protective layer comprises (a) thermoplastic resin having a COOH or OH group, (b) a polyamine or polyisocyanate, and a (c) a thermoplastic resin, or a composition based on a silicone-modified resin.

The various types of release materials can be categorized as waxes, such as petroleum waxes, vegetable waxes, animal waxes, and synthetic waxes; fatty acid metal soaps, such as metal stearates and others, for example, calcium ricinoleate; other long chain alkyl derivatives, fatty esters, fatty amides and amines, fatty acids and alcohols; polymers, such as polyolefins, silicones, fluoropolymers, natural polymers; others like poly(vinyl alcohol) and polyoxyalkylenes; fluorinated compounds and fluorinated fatty acids; and inorganic materials, such as silicates, talc, clays, kaolin, mica, and other particulates such as silica, graphite and carbon.

While all of the above references propose release coatings of various types, there remains a need for effective, inexpensive, high temperature, high humidity release coatings which can be applied to thermally resistant polymer films and which do not permanently transfer off the film to the surface in contact therewith.

Traditional release agents such as erucamide and polytetrafluoroethylene, which bloom to the surface in polyolefins, fail to do so in case of nylon films, such as polyamide66. Apparently, polyamide66 films have higher surface tension (43-50 dyn/cm), can absorb up to 2% by weight of water and can be heated up to 150° C. with no degradation. All these properties make polyamide66 film a friendly substrate for coating with water based coatings.

The coating composition described in co-owned U.S. Pat. No. 5,776,831 has been found to leave trace amounts on rubber which are visible to the human eye, when used as a release coating on polymer release films. While this can be considered an aesthetic problem only, it has been found to be a problem when double ply sheets are manufactured, since the transferred coating seems to prevent adhesion between the sheets.

The disclosures of all documents, patents and applications referred to herein are incorporated herein by reference.

SUMMARY OF THE INVENTION

Thus in one aspect, the present invention provides a coating composition for use as a surface coating for polymer release films for use in at least one of high temperature and high humidity applications, which comprises a solution of at least one hydroxypropyl methylcellulose having hydroxypropyl molar substitution of from 0 to about 0.82 in combination with at least one water-borne fluorochemical additive selected from perfluoralkyl methacrylic acid copolymers.

In another aspect, the invention provides a composition as defined above, wherein the amount of the at least one hydroxypropyl methylcellulose having hydroxypropyl molar substitution of from 0 to about 0.82, preferably 0.21 and comprises from about 27% to about 50% by weight of solids in the solution, while the amount of the fluorochemical additive comprises from about 73% to about 50% by weight of solids in the solution. The solution includes water and an organic solvent, alcohol being an example of the latter. The amount of water in the solution may range from about 80% to about 10% by weight of total solution. The amount of organic solvent may range from about 20% to about 90% by weight. The percentage of solids in solution is derived from the methylcellulose and the perfluoralkyl methacrylic copolymer. In the case of the methylcellulose component, this is about 100% by weight solids, while the fluoro additive typically comprises about 30% by weight solids. Generally, the percent by weight solids in the solution is kept very low, the range being from about 5% to about 1% by weight. In the case of a typical composition, the amount of solids range from about 1% to about 2% by weight.

In another aspect, the invention provides a process for coating the surface of a polymer film to provide a release film for use in high temperature and/or high humidity conditions, which comprises coating at least one surface of the polymer film with a solution as described above to provide a coating weight of at least about 0.004 lb/ream per side and drying the coated film to set the coating. Generally, the range is from about 0.1 lb/ream per side to about 0.3 lb/ream per side. In another embodiment of this process, the film is coated on both sides in separate passes or in a single pass to achieve the desired coating weight.

In yet another aspect, the invention provides a release polymer film coated on at least one surface with a solution as described above.

The release coating of the present invention has been found to be useful in cured rubber manufacturing applications and also has utility in the manufacture of SMC, BMC and TMC, as well as fiberglass composites. In addition, it is useful in applications such as those described in U.S. Pat. Nos. 3,837,375 (packaging of hot, highly viscous, tacky polymers such as low molecular weight polystyrene); U.S. Pat No. 5,858,487 (laminated, non-stick food wraps); and U.S. Pat. No. 4,735,860 (therma-sensitive transfer sheets); as well as EP 0 295 375 (cyanate resin-based prepregs and films for use in advanced structural materials). In another aspect the invention provides a process for curing rubber which comprises forming a sheet rubber layer in a calendar, laying layers of a release film as described above between layers of the sheet rubber, tightly overwrapping the stack of layers with a release film or cloth, before subjecting the stack of layers to elevated temperature in a dry or steam oven wherein the sheet rubber or sheet molding compound is cured and subsequently unwrapping the stacked, cured sheets.

In another aspect the invention provides a process for producing sheet molding composites which comprises:
  (a) casting a layer of heat-curable thermosetting resin, in fluid form, onto a continuously advancing polymeric release film;
  (b) introducing reinforcing material onto the advancing fluid layer;
  (c) laying a polymeric film on the top surface of said reinforced fluid layer thereby forming a sandwich composite;
  (d) advancing said sandwich composite through a series of kneading and compaction rolls; and
  (e) winding the sandwiched composite into a roll for partial curing;

the improvement comprising using a release film as defined above.

In another aspect the invention provides a process for making thick molding composites, comprising
  (a) introducing reinforcing material into a heat-curable thermosetting resin, in fluid form and mixing same until the material is mixed and wetted;
  (b) casting a layer of said mixture onto a continuously advancing polymeric film;
  (c) laying a polymeric film on the top surface of said reinforcing material-resin layer to form a sandwich composite;
  (d) advancing the sandwich composite through at least one compaction roll;
  (e) cutting the continuous lengths of the sandwich composite into lengths for partial curing;

the improvement comprising using a release film as defined above.

There are other fluoro based aqueous release coating compositions available commercially. Typically, these formulations are dispersions, while the improved formulation of this invention is a uniform solution, which is more amenable to coating using a gravure process.

DETAILED DESCRIPTION OF THE INVENTION

In the following Table 1 there is set out the hydroxypropyl molar substitution of various grades of hydroxypropyl methylcellulose available commercially from the Dow Chemical Company, which have been found to be useful in the present invention.

TABLE 1

DIFFERENT GRADES OF HYDROXYPROPYL
METHYL CELLULOSE

| Product | Hydroxypropyl molar substitution |
|---|---|
| Methocel ®A | 0 |
| Methocel ®E | 0.23 |
| Methocel ®F | 0.13 |
| Methocel ®J | 0.82 |
| Methocel ®K | 0.21 |

Methocel A does not contain any hydroxypropyl groups. Methocel(s) E, F, J and K contain varying ratios of hydroxypropyl and methyl substitution, a factor that influences organic solubility and thermal gellation in aqueous solutions.

Hydroxypropyl methyl cellulose grades can be classified into high viscosity and low viscosity grades. Low viscosity grades of hydroxypropyl methyl cellulose are those grades, which at solution concentration of about 2% in water at room temperature (20° C.) result in the solution viscosity in the range of 0.1-100 centipoise. A viscosity of 35 centipoise seems to be optimum, a lower viscosity (3 centipoise) leads to transfer. High viscosity grades of hydroxypropyl methyl cellulose are those grades, which at solution concentration of about 2% in water at room temperature (20° C.) result in the solution viscosity in the range of 100-100,000 centipoise. The solutions of surface treated grades of hydroxypropyl methylcellulose available from Dow Chemical Company in water require pH adjustment in order to trigger the hydration process and subsequently, the viscosity build up. The latter trigger can be conveniently achieved by adding a small amount of base, such as ammonium hydroxide to the dispersion of surface treated hydroxypropyl methylcellulose in water.

The type of fluorochemical additive found to be effective in the improved formulation of the invention is selected from fluorochemical additives that are excellent wetting and leveling agents. They reduce the surface tension of water and are capable of creating surface tensions as low as 18 dyn/cm. A commercial example of this type of fluorochemical additive is water soluble perfluoroalkyl methacrylic acid copolymers available from E.I. du Pont de Nemours under the Trademark ZONYL. Specific water-borne fluorochemical additives are ZONYL 8740, 9338, 9361, 8867L and 9360, as well as ZONYL NWG.

The range for the amounts of the methylcellulose and the fluorochemical additive which may typically be added to the formulation are as follows:

Range:
lower limit: 0.4% methylcellulose solid+(3.5% fluorochemical=1.05% solids)=28% methylcellulose and 72% fluorochemical in the solids
upper limit: 0.9% methylcellulose solid+(3.0% fluorochemical=0.9%)=50% methylcellulose and 50% fluorochemical in the solids Defining this range in terms of solids:
27-50% methylcellulose, >50% results in transfer to the substrate, and about 25% is required to bond the fluorochemical onto the Nylon film, we did attempt coating the fluorochemical alone and were not successful. A minimum amount of methylcellulose as binder is required to get the fluorosurfactant fluorochemical onto the Nylon film.
73-50% fluorosurfactant fluorochemical: This additive is responsible for the release characteristics at very very low levels. It would work quite well by itself if it could be coated onto the film, it does not bond to the Nylon film and so needs a binder.

BRIEF DESCRIPTION OF THE DRAWINGS

In the accompanying drawings which are used to illustrate the present invention only.

DETAILED DESCRIPTION OF THE INVENTION

Example

Figure 1:
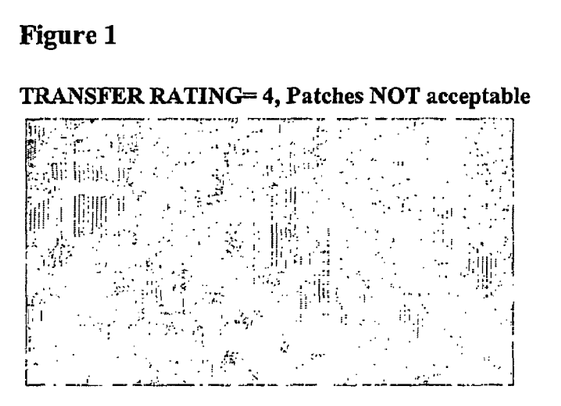
FIG. 1 is a photograph of silicone sheet which shows patches of coating remaining after a prior art release film has been removed.
Figure 2:
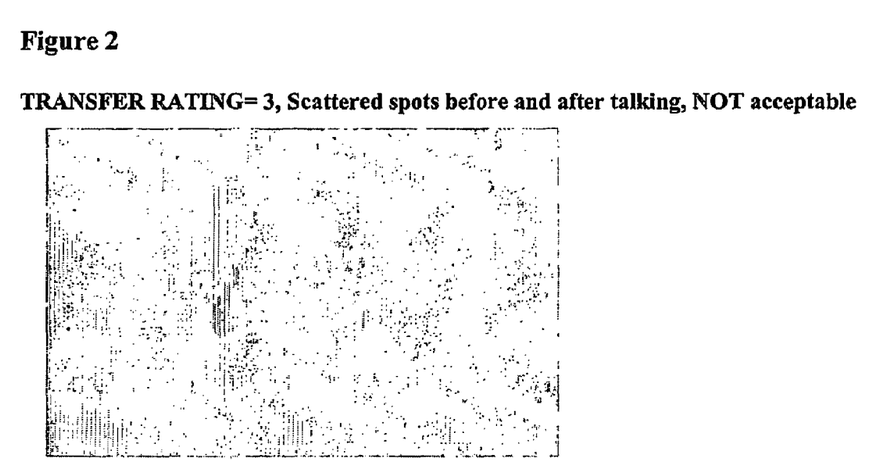
FIG. 2 is a photograph of a silicone sheet which shows scattered spots of coating remaining after removal of a prior art release film and after talcing.
Figure 3:
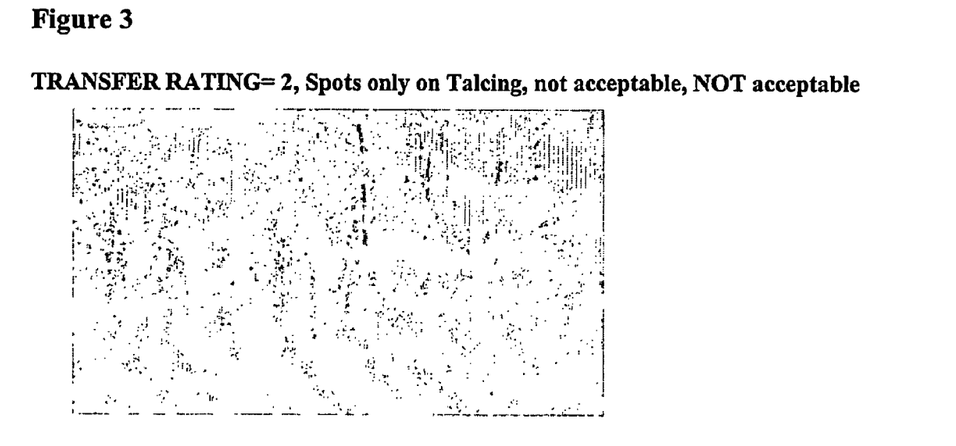
FIG. 3 is a photograph of silicone sheet which shows spots of coating remaining but only on talcing.
Figure 4:
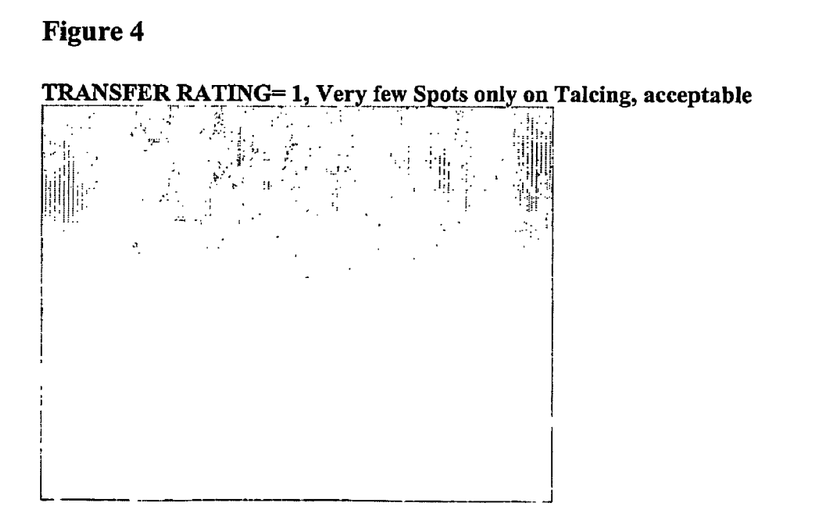
FIG. 4 is a photograph of silicone sheet which shows very few spots of coating remaining but only on talcing.
Figure 5:
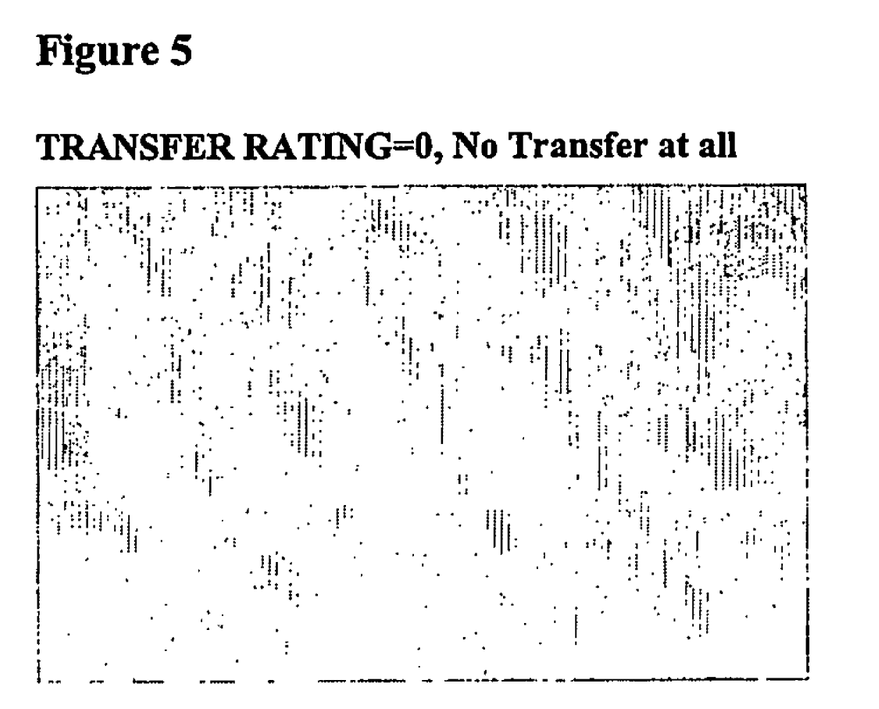
FIG. 5 is a photograph of silicone sheet which shows no transfer at all and to which has been applied a release film of the present invention.

Composition:
Isopropyl alcohol: 15%
Methocel K35LV (Hydroxypropyl methylcellulose): 0.4 to 0.9%
Zonyl 8740 (Perfluoroalkyl methacrylic copolymer, 30 wt % in water): 3.5 to 3.0%
Water: 81.1%

Coating Preparation Procedure:
Added the appropriate amount of Methocel K35LV slowly with constant stirring to the appropriate amount of Isopropyl alcohol. Stirred for ½ hour until a homogenous dispersion is formed. Added water to the above dispersion with constant stirring. The preweighed amount of Zonyl was added to the above solution with stirring. Coating Procedure: gravure coated onto Nylon 66 (Dartek) film using a 180 quad cylinder. Coat Weights: about 0.06 lbs/ream/side.

Examples of Invention:
Nylon 66 film coated with the new formulation was tested on several rubber samples for the following performance criteria:
1. Release: ease with which the film sample can be peeled off the rubber after curing.

2. Transfer: extent to which the coating material transfers onto the cured rubber surface, leading to marking that becomes more prominent on applying talc. Measured by visual inspection. Mostly an aesthetic issue but in some cases where the rubber sheet is double plied, transfer leads to reduced adhesion between the sheets.

Comparisons:
Uncoated Nylon 66 film:
  does not show adequate release from Silicone rubbers (several colours from several customers were tested: brown, orange, red, grey and tan. The colour chemistry seems to affect the performance of the films.)
  does not show adequate release from Neoprene rubbers (white and black).
  does not release from viton (black)
  does not release from most grades of Nitrile rubbers (black and white).
  does not release from Butyl rubbers (natural and black).
  does release from very few grades of neoprene(black), epdm, silicone rubbers.

Coated product of Prior Art (U.S. Pat. No. 6,776,831)
  shows good release from Silicone rubbers (brown, red, grey), Neoprene, Viton, Nitrile and Butyl rubbers.
  does not release from tan and orange Silicone.
  extensive transfer of the coating onto the rubber in the case of Silicones (brown and red), Viton (black), Nitrile (Black and White), Neoprene (black), EPDM (black).
  extensive transfer in the case of white Nitrile sample hindering adhesion in double plying.

Coated Product of Invention:
  good release and minimum transfer at levels acceptable by visual inspection in all the above cases from the following rubber samples
Silicones (brown, red, orange, tan, grey)
Vitons (black)
Nitriles (black and white)
Neoprene (black)
EPDM (black)
Butyl (natural and black)
No adhesion issues in double plying in the case of white Nitrile.

The coating of the composition can be performed by rolling, dipping or spraying. The rolling method is preferred. Details of these coating methods are well known to those skilled in the art. Drying of the coated film is preferably by air drying, in a heated oven, at a temperature in the range of about 40° C. to about 120° C.

The humidity conditions under which the release film performs range from 0 to about 100% relative humidity. The high temperature conditions range from about room temperature (20° C.) to about 210° C.

The solution of methylcellulose may comprise a binary mixture of an organic solvent and water. There are a variety of organic solvents that may be used in such a binary mixture and the organic solvent may be selected from glycols, esters and amines. The Dow Technical Handbook for Methocel Cellulose Ethers referenced earlier contains a listing of suitable specific solvents. The solution may be prepared in concentrated form and then diluted to an appropriate concentration for the desired coating weight.

The polymer film may be selected from polyolefins, polyesters, nylons and blends thereof. Nylon 66, Nylon 6 and polyester films are preferred. The films may be monoaxially or biaxially oriented. Generally any film having a softening point above the temperature of the application for the coating may be used. A preferred film is monoaxially oriented (in the machine direction) nylon, in particular nylon 66. A commercial example is Dartek T404 available from Enhance Packaging Technologies Inc. This film has good MD shrink properties at rubber curing conditions.

In the following examples of the invention, a 0.001" thick, monoaxially oriented, annealed at 150° C., polyamide66 film supplied by Enhance Packaging Technologies Inc. of Whitby, Ontario under the trade name Dartek® T404 was coated using a direct gravure coater supplied by Faustel Inc. of Germantown, Wis. DuPont Dow Elastomers Inc. of Akron, Ohio supplied the uncured rubber compound used for dry and wet release testing, under the commercial name of Viton®. The latter rubber compound contained 100 parts of Viton® fluoroelastomer A201C, 3 parts of MgO, 6 parts of Ca(OH)$_2$ and 30 parts of carbon black.

In the Examples, the coat weight of coated release film was determined by washing off the coating with water from the 8"×8" square sample. The weight loss in grams was multiplied by a factor of 14.9 to obtain the coat weight in lb/ream or in g/0.61 m$^2$. The latter technique was recommended by Morton International, Inc. Packaging Adhesives North America of Woodstock, Ill. in document #W-3020-641-02 dated May 15, 1994.

Release Testing Protocol

Two types of curing equipment are commonly used for curing rubber in the rubber release industry, viz. steam and gas ovens.

In a dry release test, approximately 2.5 g of rubber are pressed in between two release sheets at 10,000 pounds pressure in a 9 inch×9 inch (22.86 cm×22.86 cm) press and 350° F. (176° C.) for 1 hr (most silicone rubbers are for 10 minutes). The time required here is rubber dependent. At least 35 minutes is required for Viton® rubber. Subsequently, the sample is cooled to room temperature and a strip (4"×½") of the release sheet/rubber/release sheet sandwich is cut and subjected to a 90 degree peel test at a crosshead speed of 10"/min using a peel tester. The peel test is conducted as per the Pressure Sensitive Tape Council's appendix B and ASTMD1876. Curing conditions are rubber sample dependent. The dry release test is designed on the assumption that humidity has no effect on peel strength.

A wet release test is designed such that the high humidity curing condition is taken into account. As per this test, a 6"×3" sheet of uncured Viton® rubber compound interleaved with the release film is rolled onto a stainless steel core, 6" long having an outer diameter of ¾". A cross-sectional view of the rubber interleaved with the release film mounted on the core is shown in FIG. 6(A). The latter roll is over-wrapped with a masking tape. This roll is fed into an autoclave for curing at 160° C., 80 psi steam The rubber roll is kept in the autoclave under latter conditions for 6 hours before cooling down the autoclave and taking out the cured rubber rolls. On cooling the steam condenses and collects at the bottom of the clave. The rolled rubber samples are placed on a wire mesh to prevent them from being submerged in the water. Subsequently, the rubber rolls are unwrapped and the force required to peel off the release film from the cured rubber is determined as per the Pressure Sensitive Tape Council's appendage B and ASTMD1876.

Wettability of Dartek® T404

Zonyl by itself does not wet the Dartek T404 film, but the combination of the invention does.

The invention may be varied in any number of ways as would be apparent to a person skilled in the art and all obvious equivalents and the like are meant to fall within the scope of this description and claims. The description is meant to serve as a guide to interpret the claims and not to limit them unnecessarily.

The invention claimed is:

1. A coating composition for use as a surface coating for polymer release films for use in at least one of high temperature and high humidity applications, which comprises a solution of at least one hydroxypropyl methylcellulose having hydroxypropyl molar substitution of from 0 to about 0.82 in combination with at least one water-borne fluorochemical additive selected from perfluoralkyl methacrylic acid copolymers.

2. A composition as claimed in claim 1, wherein the amount of the at least on hydroxypropyl methylcellulose having hydroxypropyl molar substitution of from 0 to about 0.82 comprises from about 27% to about 50% by weight of the solids in the solution, while the amount of the fluorochemical additive comprises from about 73% to about 50% by weight of solids in the solution.

3. A composition as claimed in claim 1, wherein the solution includes water and an organic solvent.

4. A composition as claimed in claim 1, wherein the solution comprises alcohol and water and the amount of water in the solution may range from about 80% to about 10% by weight of total solution and the amount of organic solvent may range from about 20% to about 90% by weight.

5. A composition as claimed in claim 1, wherein the percent by weight solids in the solution is less than about 2% by weight.

6. A process for coating the surface of a polymer film to provide a release film for use in high temperature and/or high humidity conditions, which comprises coating at least one surface of the polymer film with a coating composition as claimed in claim 1 to provide a coating weight of from at least about 0.004 lb/ream to about 0.3 lb/ream per side and drying the coated film to set the coating.

7. A process as claimed in claim 6, wherein the coating weight is from about 0.1 lb/ream per side to about 0.3 lb/ream per side.

8. A process as claimed in claim 6, wherein the release polymer film is coated on at least one surface.

9. A process for curing rubber which comprises forming a sheet rubber layer in a calendar, laying layers of a release film obtained by the process of claim 6 between layers of the sheet rubber, tightly overwrapping the stack of layers with a release film or cloth, before subjecting the stack of layers to elevated temperature in a dry or steam oven wherein the sheet rubber or sheet molding compound is cured and subsequently unwrapping the stacked, cured sheets.

10. A process for producing sheet molding composites which comprises:
  (a) casting a layer of heat-curable thermosetting resin, in fluid form, onto a continuously advancing polymeric release film;
  (b) introducing reinforcing material onto the advancing fluid layer;
  (c) laying a polymeric film obtained by the process of claim 6 on the top surface of said reinforced fluid layer thereby forming a sandwich composite;
  (d) advancing said sandwich composite through a series of kneading and compaction rolls; and
  (e) winding the sandwiched composite into a roll for partial curing.

11. A process for making thick molding composites, comprising:
  (a) introducing reinforcing material into a heat-curable thermosetting resin, in fluid form and mixing same until the material is mixed and wetted;
  (b) casting a layer of said mixture onto a continuously advancing polymeric film;
  (c) laying a polymeric film obtained by the process of claim 6 on the top surface of said reinforcing material-resin layer to form a sandwich composite;
  (d) advancing the sandwich composite through at least one compaction roll; and
  (e) cutting the continuous lengths of the sandwich composite into lengths for partial curing.

12. The process of claim 6, wherein the film is coated on both sides in either separate passes or in a single pass to achieve the desired coating weight.

* * * * *

UNITED STATES PATENT AND TRADEMARK OFFICE
CERTIFICATE OF CORRECTION

PATENT NO. : 7,662,322 B2 Page 1 of 1
APPLICATION NO. : 10/543165
DATED : May 26, 2006
INVENTOR(S) : Ranganathan et al.

It is certified that error appears in the above-identified patent and that said Letters Patent is hereby corrected as shown below:

On the Title Page,

Item [*] Notice: Subject to any disclaimer, the term of this patent is extended or adjusted under 35 U.S.C. by 672 days.

Delete the phrase "by 672 days" and insert --by 936 days--

Column 4, Line 63 reads, "...which prevents sticking and blocling..." which should read, "...which prevents sticking and blocking..."

Column 6, Line 22 reads, "...described in U.S. Pat. Nos...." which should read, "...described in U.S. Pat No...."

Column 10, Line 51 reads, "...80 psi steam The rubber..." which should read, "...80 psi steam. The rubber..."

Signed and Sealed this

Twentieth Day of July, 2010

David J. Kappos
*Director of the United States Patent and Trademark Office*